US010291722B1

(12) United States Patent
Mendez

(10) Patent No.: US 10,291,722 B1
(45) Date of Patent: May 14, 2019

(54) METHOD AND APPARATUS FOR IMPLEMENTING CO-BROWSING BETWEEN DOMAINS

(71) Applicant: Glance Networks, Inc., Arlington, MA (US)

(72) Inventor: Deborah Mendez, Arlington, MA (US)

(73) Assignee: Glance Networks, Inc., Arlington, MA (US)

( * ) Notice: Subject to any disclaimer, the term of this patent is extended or adjusted under 35 U.S.C. 154(b) by 205 days.

(21) Appl. No.: 15/143,830

(22) Filed: May 2, 2016

Related U.S. Application Data

(60) Provisional application No. 62/154,887, filed on Apr. 30, 2015.

(51) Int. Cl.
*G06F 15/16* (2006.01)
*H04L 29/08* (2006.01)
*H04L 12/58* (2006.01)
*H04L 29/06* (2006.01)

(52) U.S. Cl.
CPC .......... *H04L 67/146* (2013.01); *H04L 51/046* (2013.01); *H04L 63/20* (2013.01); *H04L 65/1069* (2013.01); *H04L 67/025* (2013.01); *H04L 67/142* (2013.01)

(58) Field of Classification Search
CPC ... H04L 67/146; H04L 67/025; H04L 67/142; H04L 51/046; H04L 65/1069; H04L 63/20
USPC ......................... 709/203, 206, 227, 204, 205
See application file for complete search history.

(56) References Cited

U.S. PATENT DOCUMENTS

| 7,149,776 B1 * | 12/2006 | Roy | G06F 16/954 709/205 |
| 8,051,178 B2 * | 11/2011 | Skidgel | G06F 16/954 709/227 |
| 8,682,977 B1 * | 3/2014 | Roy | H04L 65/403 709/205 |
| 9,736,214 B2 * | 8/2017 | Mendez | G06F 17/2247 |
| 2003/0061286 A1 * | 3/2003 | Lin | H04L 67/02 709/205 |

(Continued)

OTHER PUBLICATIONS

R. Cahchan, *Cross Domain Browser Window Messaging with HTML5 and Javascript*, Aug. 2012, 12 pages.

(Continued)

*Primary Examiner* — Thu Ha T Nguyen
(74) *Attorney, Agent, or Firm* — Anderson Gorecki LLP

(57) ABSTRACT

A communication session extant via a first browser window may be continued from a first web page in a first domain to a second web page in a second domain by causing the second web page to be opened in a second browser window. The first browser window and second browser window open message handlers and use post message to forward a communication session ID to the second browser window. Where the communication session ID is written into a first domain first-party cookie by script on the first web page, messaging the communication session ID to the second browser window enables script on the second web page to write the value of the first domain first-party cookie into a second domain first-party cookie. The communication session ID can then be used to continue the communication session by the script of the second web page.

21 Claims, 9 Drawing Sheets

(56) References Cited

U.S. PATENT DOCUMENTS

| | | | |
|---|---|---|---|
| 2003/0156591 A1* | 8/2003 | Sorsa | H04L 67/42 370/401 |
| 2004/0215731 A1* | 10/2004 | Tzann-en Szeto | H04L 51/04 709/207 |
| 2005/0033843 A1* | 2/2005 | Shahi | G06F 17/30899 709/226 |
| 2005/0267870 A1* | 12/2005 | Everett-Church | G06F 17/30864 |
| 2007/0245249 A1* | 10/2007 | Weisberg | G06F 9/451 715/758 |
| 2008/0052377 A1* | 2/2008 | Light | G06Q 10/107 709/218 |
| 2010/0082747 A1* | 4/2010 | Yue | G06F 16/954 709/204 |
| 2014/0237039 A1* | 8/2014 | Bank | H04L 67/22 709/204 |
| 2015/0067181 A1* | 3/2015 | Roy | H04L 67/1095 709/227 |
| 2015/0149916 A1* | 5/2015 | Mendez | G06F 17/30873 715/738 |

OTHER PUBLICATIONS

Microsoft.com, *message / onmessage event*, unknown publication date, 3 pages.
J. Hoepman, *Tracking cookies across multiple websites using only first party cookies*, Oct. 2013, 4 pages.
D. Walsh, *HTML5's window.postMessage API*, Nov. 2010, 9 pages.
M. Dhawan, *Priv3: A Third Party Cookie Policy*, Oct. 2012, 4 pages.
Stack Overflow, *Invoking JavaScript code in an iframe from the parent page*, 8 pages, Oct. 2008.
V. Welling, *Cross-Domain Cookies*, Dec. 2014, 3 pages.
S. Maskalik, *Cross Domain Communication and Data Storage with localStorage and postMessage*, Mar. 2012, 11 pages.
Developer.mozilla.org, *Window.postMessage( )*, unknown publication date, 6 pages.
Stack Overflow, *javascript—Share cookies with other domains*, Jun. 2014, 3 pages.
Spec.whatwg.org, *HTML Living Standard*, May 2016, 43 pages.

\* cited by examiner

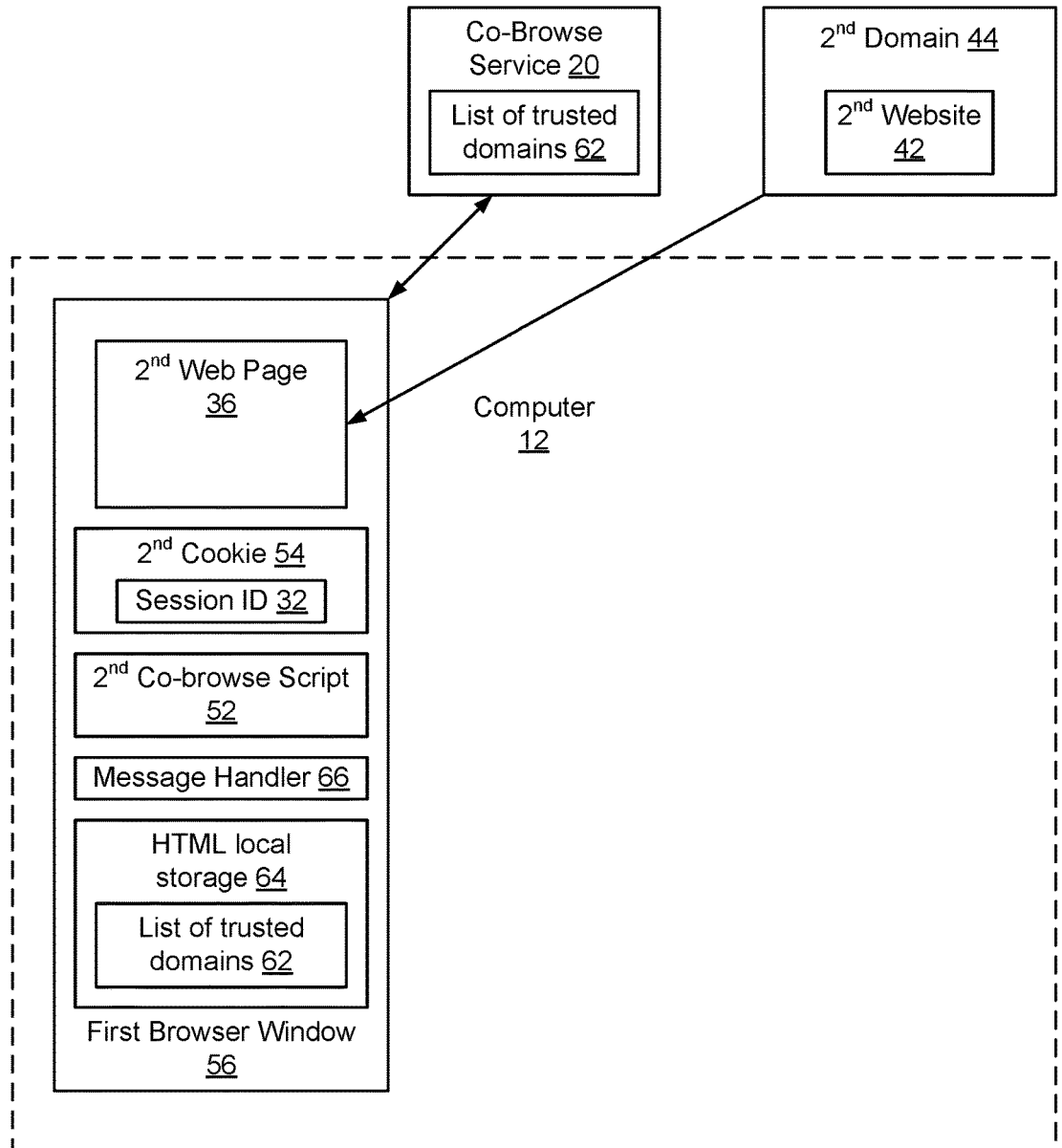

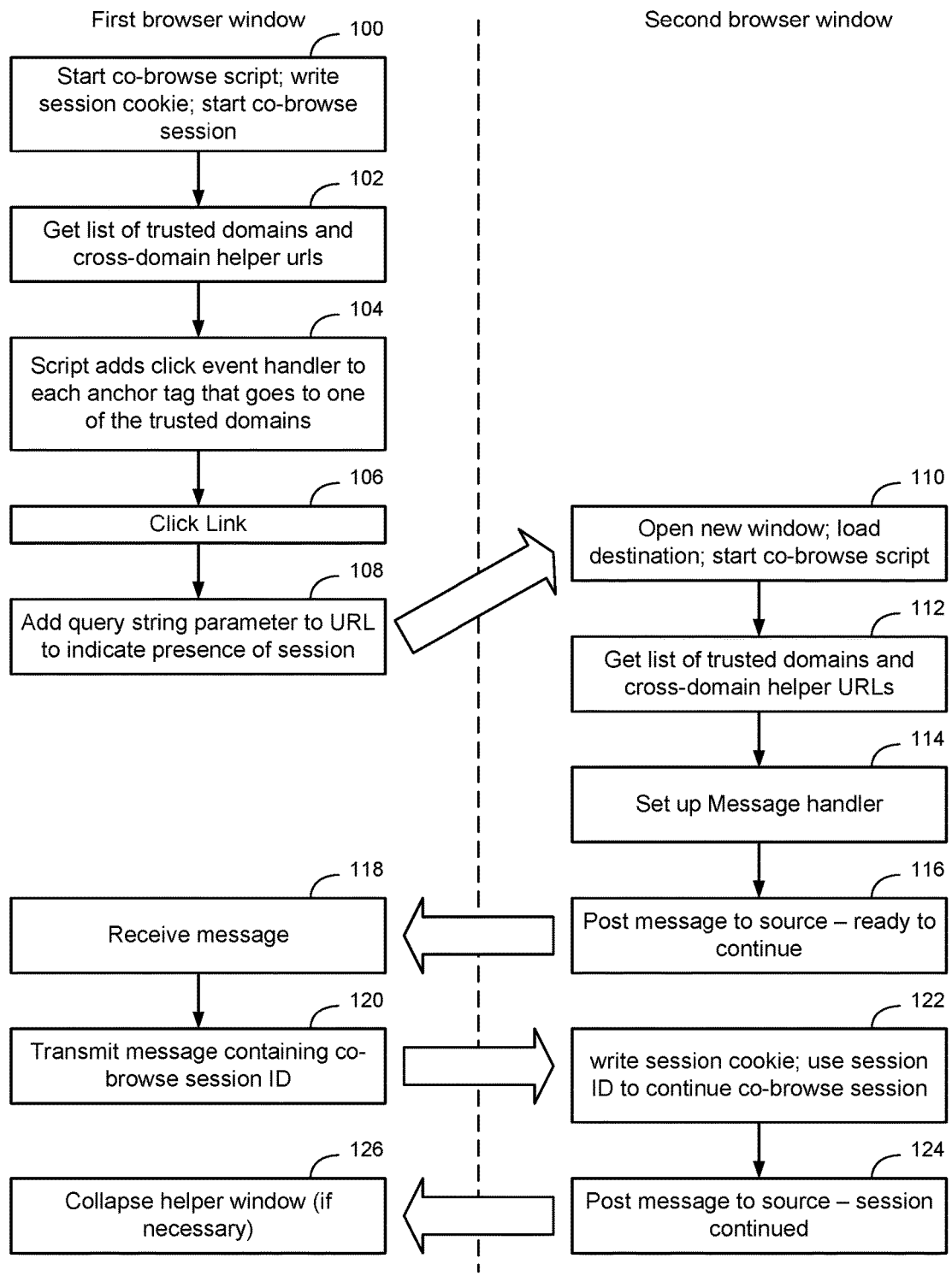

METHOD AND APPARATUS FOR IMPLEMENTING CO-BROWSING BETWEEN DOMAINS

CROSS REFERENCE TO RELATED APPLICATIONS

This application claims priority to U.S. Provisional Patent Application No. 62/154,887, filed Apr. 30, 2015, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to communication sessions and, more particularly, to a method and apparatus for enabling cross-domain browser based communication for session continuation. In one implementation, the field relates to enabling continuation of co-browsing sessions between domains.

SUMMARY

All examples and features mentioned below can be combined in any technically possible way.

In one aspect, a method of maintaining a communication session across domains includes loading a first web page on a first domain in a first browser window on a first computer at a first location and initiating a first communication session through the first browser window to a remote browser window on a second computer at a second location, the first communication session having a first communication session identifier. The method also includes receiving, by the first browser window, a click event selecting a link to a second web page on a second domain, opening the second web page on the second domain in a second browser window on the first computer at the first location, messaging between the first browser window on the first computer and second browser window on the first computer to pass the first communication session identifier to the second browser window, and using the first communication session identifier by the second browser window to join the first communication session.

In some implementations, the first communication session is a text-based communication session established through the first browser window.

In certain implementations, the step of initiating the first communication session comprises opening a chat window overlaid on top of the first browser window.

In some implementations the first communication session is a voice or video based communication session established through the first browser window.

In certain implementations, the voice or video based communication session comprises a signaled connection on the network, and wherein a local connection within the first computer interconnects the signaled connection on the network with the first browser window.

In some implementations, the step of using the first communication session identifier comprises redirecting the local connection to cause the local connection to interconnect the signaled connection on the network with the second browser window.

In certain implementations, the first communication session is a co-browse communication session in which the content of the first browser is able to be viewed in the remote browser window on the second computer at the second location.

In some implementations, wherein the step of messaging comprises the steps of opening a message handler on the first browser window, opening a message handler on the second browser window, and using post message to communicate the first communication session identifier to the second browser window.

In certain implementations, the method further includes the steps of determining, by the second browser window, a source of the post message, and comparing, by the second browser window, the identified source of the post message with a list of trusted sources.

In another aspect a method of enabling co-browsing between domains includes loading a first web page on a first domain in a first browser window on a first computer at a first location, the first web page having first co-browse script to participate in a co-browse session in which the content of the first browser window is viewable in a remote browser window on a second computer at a second location. The method also includes initiating, by the co-browse script, the co-browsing session from the first web page to enable the content of the first browser to be viewed in the remote browser window on the second computer at the second location, and writing, by the first co-browse script, a first domain first-party cookie containing as a value a session ID of the co-browse session. The method also includes receiving, by the first browser window, a click event selecting a link to a second web page on a second domain, opening the second web page on the second domain in a second browser window on the first computer at the first location, the second web page having second co-browse script. The method also includes messaging between the first browser window on the first computer and second browser window on the first computer to pass the session ID of the co-browse session contained in the first domain first-party cookie to the second browser window, writing, by the second co-browse script in the second browser window, a second domain first-party cookie containing, as a value, the session ID of the co-browse session, using the session ID, by the second co-browse script, to join the co-browse session, and transmitting, by the second co-browse script on the second web page, the content of the second browser window to the remote browser window.

In some implementations, the method further includes the step of closing the second browser window.

In certain implementations, if the click event selecting the link is configured to open to a new window or a new tab in the first browser, the method further comprising the step of replacing a URL associated with the link to a cross-domain helper URL and the step of opening the second web page causes the cross-domain helper URL to be opened in the second window.

In some implementations, the cross-domain helper URL is scripted with co-browse script.

In certain implementations, the method further includes the step of forwarding a URL to the second domain after the step of receiving, by the first browser window, the click event selecting the link to the second web page on the second domain, wherein the step of forwarding the URL comprises adding a tag to the URL to identify the presence of the co-browse session.

In some implementations, the tag identifying the presence of the co-browse session does not include the session ID of the co-browse session.

In certain implementations, the tag identifying the presence of the co-browse session does include the session ID of the co-browse session.

In some implementations, the method further includes the step of notifying via the first browser window that a co-browse session is being started or joined by the second browser window.

In certain implementations, the step of messaging comprises the steps of opening a message handler on the first browser window, opening a message handler on the second browser window, and using post message to communicate the first communication session identifier to the second browser window.

In some implementations, the method further includes the steps of determining, by the second browser window, a source of the post message, and comparing, by the second browser window, the identified source of the post message with a list of trusted sources.

In certain implementations, the step of messaging further comprises the transmission of additional cookie parameters from the first domain first-party cookie to the second browser window, and wherein the step of writing the second domain first-party cookie by the second co-browse script in the second browser window, causes the second domain first-party cookie to contain, as values, the additional cookie parameters.

In some implementations, the additional cookie parameters include a cookie security attribute.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure.

FIGS. 6A-6B are functional block diagrams of software constructs instantiated on a user's computer engaged in a co-browsing session during a transition from a first domain to a second domain where a link opens a web page in the same browser window.

FIG. 7 is a line diagram showing the exchange of information between browser windows in connection with transitioning a co-browsing session from a first domain to a second domain.

DETAILED DESCRIPTION

Figure 1:
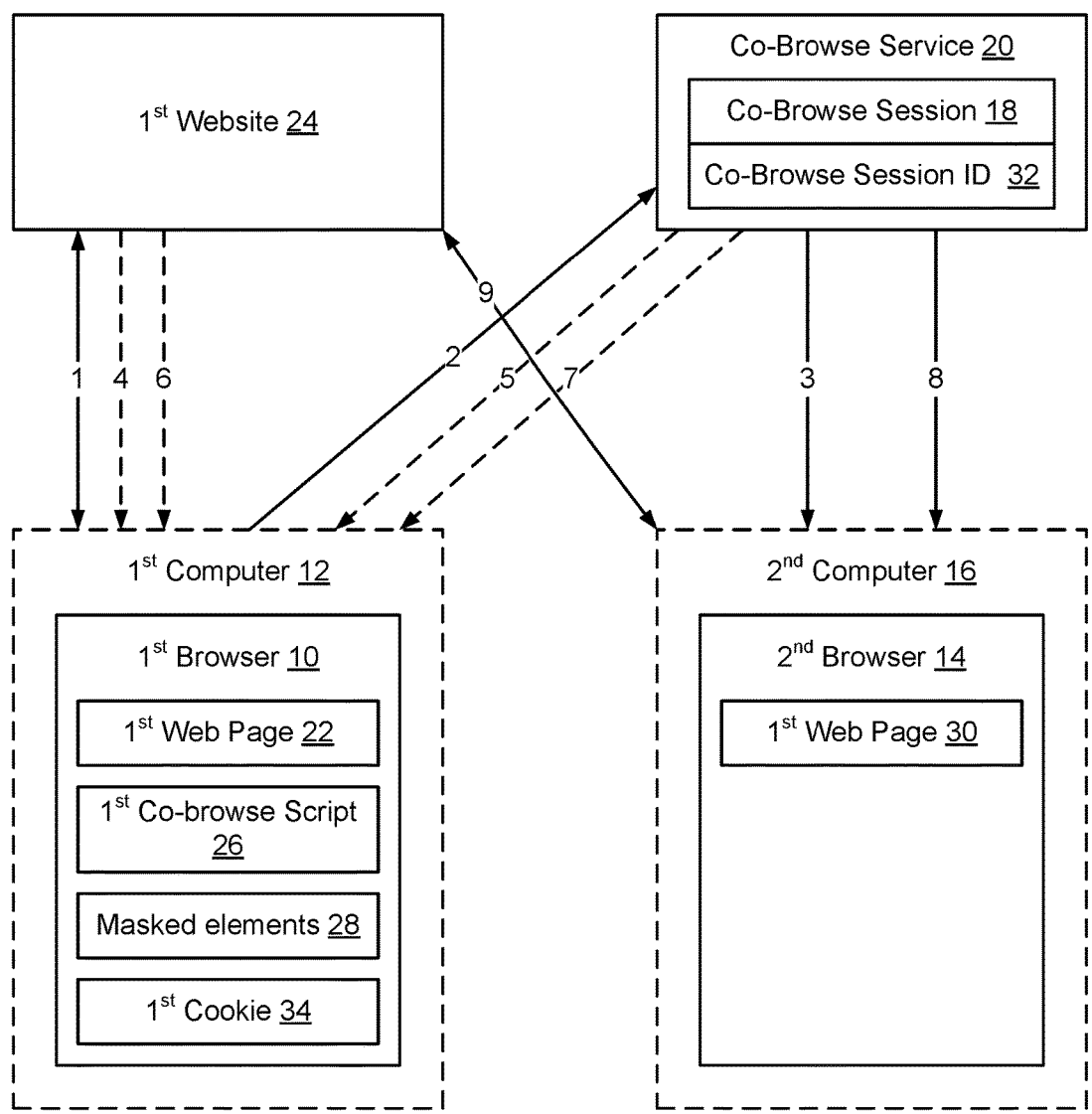
FIG. 1 is a functional block diagram illustrating the flow of information between participants in a co-browsing system.

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

Browser based communication sessions may take many forms. As an example, a person who has opened a web page in a browser window may be provided with an option to chat with a customer service representative. During the chat communication session, the customer service representative and the visitor to the web site may send text based messages to each other via a chat window associated with the website. Similarly, the person may be provided with an option to engage in a voice communication session (i.e. a Voice over Internet Protocol VoIP phone call) or to participate in a video conference through their browser. During the voice or video conference, audio and/or video content is passed between the user and another participant to the conference. Another form of communication session may also take place, in which the content of the user's browser is replicated to another browser at a remote location.

Unfortunately, where the communication session occurs within a browser window, the communication session is limited to taking place within a domain. For example, if a user is on a first website on a first domain and elects to chat with a customer service representative, if the chat window is "in-line", meaning that the chat window is overlaid on top of the website's browser window, and if the chat session relies on a first-party cookie on the web page domain in order to continue the session after navigation, if the user directs the browser to load a web page from another domain, the chat will terminate. Likewise, if a VoIP voice communication session or video telephone conference is launched from a web browser, if that browser is directed to a new website on another domain, the voice or video communication session will terminate.

These communication sessions have conventionally been limited to occur while the person remains on a web page associated with the domain. According to an implementation, communication sessions may be continued between domains as web pages from subsequent domains are loaded to the browser. An implementation will initially be described in which the type of communication session is a co-browse communication session in which the content of a first browser is replicated at a second location. In some embodiments this is accomplished by posting messages between browser windows. Although an implementation will be described in which the messages are used to post information that will allow a co-browse communication session to continue between domains, the same mechanism may be used to likewise enable other forms of communication sessions, such as chat-based, VoIP-based or video-based sessions, to continue between domains.

CO-BROWSE OVERVIEW

FIG. 1 shows a network diagram of a co-browsing scenario in which the content of a first browser 10 on a first computer 12 is visible in a second browser 14 on a second computer 16. Co-browsing takes place in a co-browse session 18 hosted by a co-browse service 20. The co-browse session 18 involves the exchange of information from the first browser 10 to the second browser 14 as discussed in greater detail herein.

Depending on the implementation, co-browse service 20 may be implemented as one or more servers configured to establish and handle co-browse sessions. In an embodiment, the co-browse service 20 is implemented as one or more signaling servers to handle signaling in connection with allowing users to establish and join co-browse sessions. In this embodiment, the co-browse service 20 further includes one or more session servers to handle transmission of data between participants on active co-browse sessions. Participants to a co-browse session, such as first computer 12 and second computer 16, participate in an exchange with the signaling server to cause a co-browse session to be established, and data that is passed between the participants to the co-browse session is communicated through one of the session servers assigned by the signaling server to handle data traffic on the co-browse session. In other implementations, both signaling and session functions may be handled by the same server. For convenience, the term "co-browse service" is used herein to refer to a collection of servers on the network configured to handle the signaling and session functions associated with establishing co-browse sessions and handling the transmission of data between participants to co-browse sessions.

In the embodiment shown in FIG. 1, the first browser 10 loads a web page 22 from a website 24. Arrow 1 shows the download of the web page 22 from the website 24 to the first browser 10. The co-browse service 20 facilitates the co-browse session 18 by relaying web page updates (arrow 2) from the first browser 10 to the second browser 14 (arrow 3). To cause the first browser 10 to provide these updates, co-browse script 26 (JavaScript in one embodiment) is downloaded to the first browser 10 either from the website 24 (arrow 4) or from the co-browse service 20 (arrow 5). Optionally, to enable privacy, a list of masked elements 28 is also downloaded to the first browser 10. Like the co-browse script 26, the list of masked elements 28 may be downloaded from the website 24 (arrow 6) or may be downloaded from the co-browse service 20 (arrow 7). The list of masked elements 28 instructs the co-browse script 26 which HTML elements (e.g. which elements of the Document Object Model DOM) should not be transmitted on the co-browse session 18. The co-browse service 20 downloads HTML updates to the second browser 14 (arrow 8). The second browser 14 downloads web page 30 from the website 24 (arrow 9) using HTML provided by the first browser 10 on the co-browse session 18. In an implementation, the HTML associated with the web page 30 is downloaded from the co-browse service 20 (arrow 8). The HTML may contain references to style sheets, images, fonts, etc., on the website 24. The second browser 14 uses these URLs to obtain content to be displayed in web page 30 from the website 24 (arrow 9) and possibly resources from other websites on the Internet. Since the HTML of the web page 30 is provided to the second browser 14 from the first browser 10 on co-browse session 18, the web page 30 displayed by the second browser will appear to be identical to web page 22 displayed on the first browser 10.

Although an embodiment will be described in which co-browse script 26 is described as being implemented using JavaScript, other forms of scripting language may be utilized as well. For example, JavaScript is an implementation of a scripting language standard by ECMA International in the ECMA-262 specification. Other implementations of this standard include JScript and ActionScript. Thus, although an implementation will be described in which JavaScript is used, the invention is not limited to this particular implementation as other forms of script may be used as well.

The co-browse solution enables the web page 30 displayed by the second browser 14 to appear to be identical to the web page 22 that is displayed on the first browser 10. Since the co-browsing session relies only on co-browse script 26 that is downloaded during the web browsing session, the first browser 10 is not required to have any manually installed software or plug-ins. Likewise, no security warning dialogs are required to be approved at the first browser 10 in order for the second browser 14 to display the same web page as is shown on the first browser 10. Additional details relating to an implementation of co-browsing is described in U.S. Patent Application Publication No. 2015/0149557, filed Jan. 16, 2015, entitled Integrating Co-Browsing With Other Forms Of Communication Sharing, the content of which is hereby incorporated herein by reference.

In one implementation, when the co-browse script 26 causes the first browser 10 to join co-browse session 18, a co-browse session ID 32 is obtained from the co-browse service 20. The co-browse script 26 stores the co-browse session ID 32 in a cookie 34, which is stored in the first browser 10 using a first-party cookie written by the co-browse script 26. Where JavaScript is being used to implement the co-browse script 26, this may be accomplished using the document.cookie property. A first-party cookie is a cookie written by the domain from which the web page is being loaded.

In one implementation, when the web page 22 is loaded to first browser 10, the co-browse script 26 checks for the presence of a cookie 34 containing a session ID 32 of an ongoing co-browse session 18. If the cookie 34 exists, and has other than a null value, the co-browse script 26 will be able to identify the co-browse session 18 to the co-browse service 20, to enable the first browser 10 to join the existing co-browse session 18. This enables, for example, a co-browse session to extend from a first web page to a second web page within a given domain. Specifically, since the first-party cookie is domain specific, the co-browse script on a second web page of the same domain will be able to read the first-party cookie written by co-browse script on a first web page of the same domain, as long as the path attribute of the cookie is blank or matches the path of the current website in the domain. Hence, within a given domain, a co-browsing session will continue between subsequent pages within a domain as the pages are loaded into the first browser 10.

However, since a web page loaded into a browser is not able to read first-party cookies written from other domains, under normal conditions the co-browse session will not carry over to pages from other web sites in other domains. Specifically, as noted above, since the session ID 32 of the co-browse session 18 is stored in the first browser 10 as a first-party cookie 34, when the first browser 10 loads a new web page from another domain, the co-browse script associated with the web page on the new domain will not be able to read the first-party cookie 34 of the first domain associated with website 34. This means that the new co-browse script downloaded from the second domain will not be able to join the previously on-going co-browse session 18, because the new co-browse script from the second web page cannot learn the session ID 32 of the original co-browse session 18. Since the new co-browse script cannot join the original co-browse session 18, to enable the second browser 14 to display the web pages on the second domain requires a new co-browse session to be started. Accordingly, if a link is selected on the web page 22 that will cause a webpage from a second domain to be loaded, the co-browse session 18 will not extend to the new domain, so that the second browser's 14 ability to view the content of the first browser 10 will end when the visitor leaves the domain associated with the domain of website 24.

Figure 2:
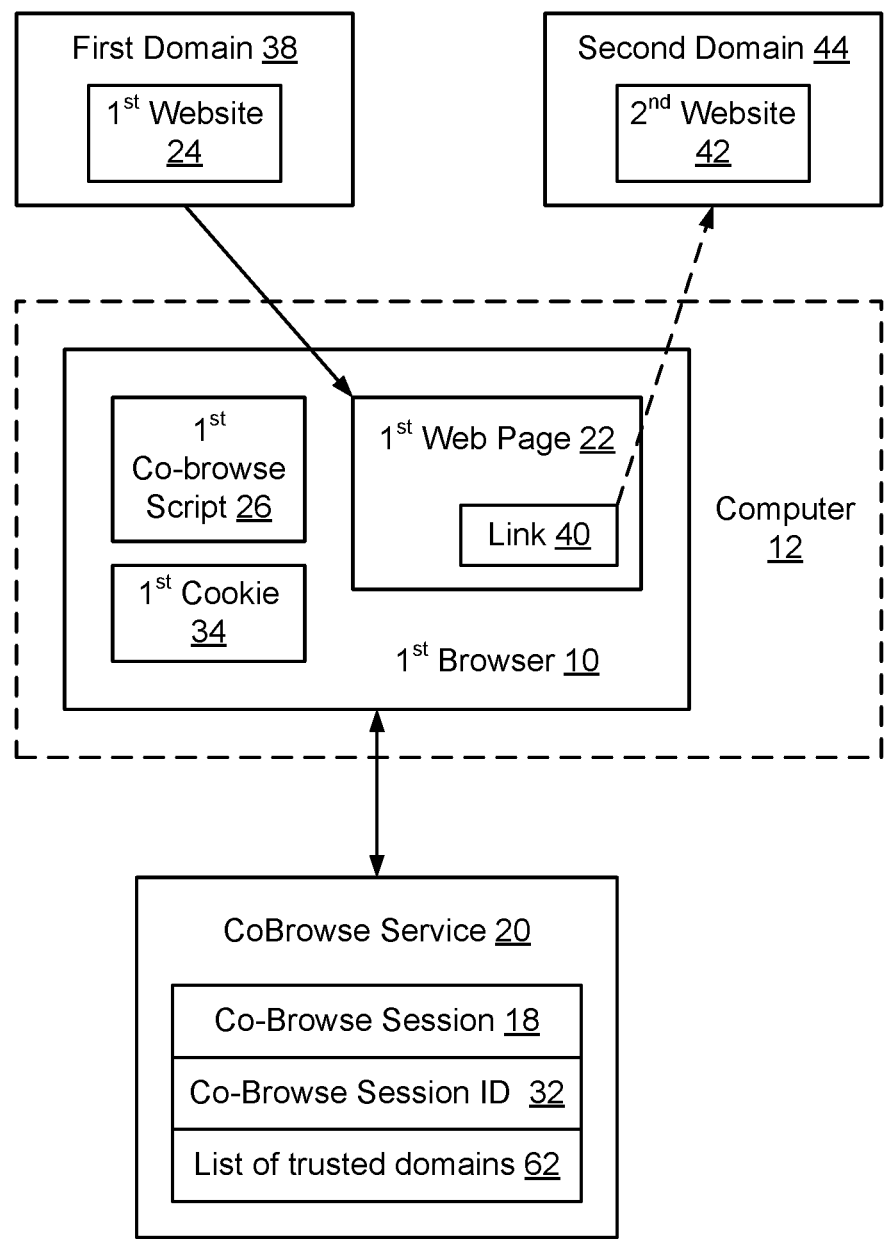
FIG. 2 is a functional block diagram of software constructs instantiated on a user's computer engaged in a co-browsing session prior to transitioning to a second domain.
Figure 3:
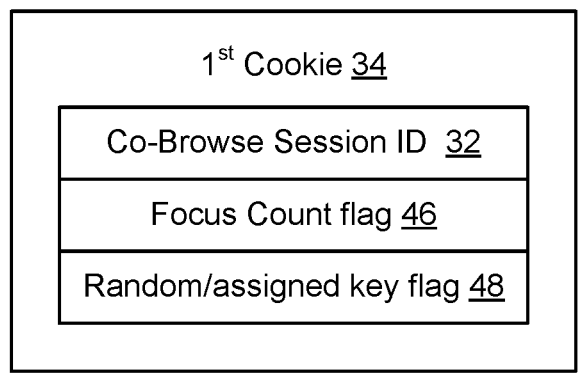
FIG. 3 is a block diagram of an example first-party cookie utilized to support co-browsing according to an implementation.
Figure 4:
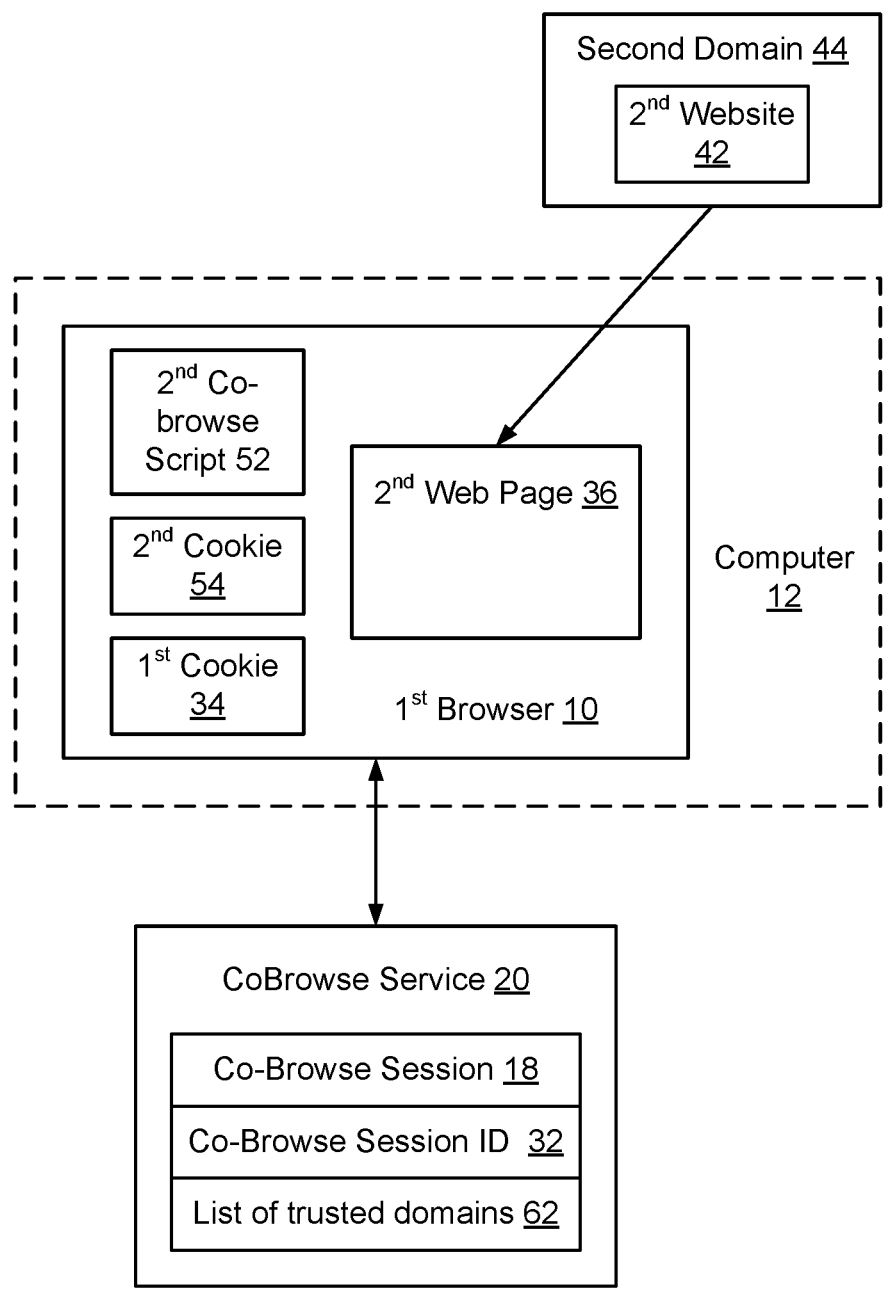
FIG. 4 is a functional block diagram of software constructs instantiated on a user's computer engaged in a co-browsing session after transitioning to a second domain.

FIGS. 2-6 show a way of exchanging information in a secure manner that enables a co-browse session 18 to continue across different domains. FIGS. 2, 4, and 5 show functional block diagrams of software constructs instantiated on the first computer 12 in an implementation, and FIG. 7 shows an example flow of information between these constructs.

In FIG. 2, first computer 12 has opened a first browser 10 in a first browser window which has loaded a web page 22 from website 24 from a first domain 38. The web page 22 includes a link 40 to a second website 42 in a second domain 44. The computer 12 is engaged in a co-browse session 18, e.g. as described above in connection with FIG. 1, utilizing co-browse service 20. Web page 22 includes co-browse script 26 which was used by web browser 10 loaded in first browser window 56 (see FIGS. 5 and 6) to create cookie 34.

Cookie 34, in an implementation, is a first-party cookie written by first domain 38. Cookies may either be first-party cookies, which are written from the domain being loaded by the browser, or are third-party cookies, which are written by other domains.

Normally, a cookie's domain attribute will match the domain that is shown in the web browser's address bar. This is called a first-party cookie. Third-party cookies, however, belong to domains different from the one shown in the address bar. These sorts of cookies typically are set when web pages feature content, such as banner advertisements, from external websites. Cookies that are set during retrieval of these components are called third-party cookies.

Cookies may be set via HTTP or by script loaded by the web page. The value of a cookie will be sent to the server in connection with subsequent communication from the browser to the server to enable the server to identify the client web page. Every time the user loads the website, the browser sends the cookie back to the server to notify the user's previous activity. A server in a given domain will only read a cookie set by that domain. Likewise script loaded by a web page will only read cookies that are scoped to the domain of the web page itself.

A session cookie, also known as an in-memory cookie or transient cookie, exists only in temporary memory while the user navigates the website. Web browsers normally delete session cookies when the user closes the browser.

A persistent cookie, unlike a session cookie, often lasts beyond a particular session at a web site. Instead of expiring when the web browser is closed as session cookies do, persistent cookies expire at a specific date or after a specific length of time. For example, when the cookie is created it may be provided with an expiration time such as 8 hours, which means that the cookie will automatically lapse after the expiration of 8 hours. This means that, for the cookie's entire lifespan (which can be as long or as short as its creators want), its information will be transmitted to the server every time the user visits the website that it belongs to, or every time the user views a resource belonging to that website from another website (such as an advertisement).

FIG. 3 shows one example of cookie 34. As shown in FIG. 3, in one implementation, the cookie 34 is created by co-browse script 26 and includes parameters that enable the co-browse script to connect to the correct co-browse session 18 at co-browse service 20. In some implementations, the cookie 34 is a first-party cookie that includes as values the co-browse session ID 32, a focus count which helps manage a situation where multiple tabs/windows are open and it is necessary to determine which tab/window has focus in the session, and a random/assigned key flag 48 to indicate whether the co-browse session was started with a random key or a key assigned based on visitor identity. Cookie 34 may be either secure or non-secure, depending on how the cookie is written. Likewise, cookie 34 may be either a session cookie or a persistent cookie depending on how it is written.

FIG. 4 shows the state of the first browser 10 when the user clicks on link 40 on web page 22, shown in FIG. 2, to redirect first browser 10 to load second web page 36 from website 42 in second domain 44. As shown in FIG. 4, the cookie 34 associated with first domain 38 will remain in first browser 10. But a first-party cookie can only be read by a web page that is on the domain that wrote the cookie. When web page 36 is loaded by first browser 10, second co-browse script 52 sourced from website 42 on second domain 44 cannot read cookie 34, since first-party cookie 34 is written by domain 38. Further, co-browse script 52 will not know that a co-browse session is on-going (because it cannot read cookie 34) and will not, therefore, start a co-browse session or attempt to join a co-browse session and will hence not write a second cookie 54. Even if co-browse script 52 does seek to join/start a co-browse session, since co-browse script 52 has not written second cookie 54 using the session ID of the first session, a new co-browse session will need to be started to enable the participants to continue co-browsing. This is inconvenient from the perspective of the participants to the co-browse session 18.

More specifically, when the first browser 10 on first computer 12 leaves first domain 38 and loads web page 36 from website 42 associated with second domain 44, the JavaScript 52 on the second webpage 36 looks for a cookie. If the second webpage 36 could find cookie 34 it could reach out to establish a new connection with the co-browse service 20 to continue the session. The problem, however, is that for security reasons the first browser 10 will not allow a web page from a domain outside of first domain 38 to read cookies set by first domain 38. So when the user clicks on link 40 to load second webpage 36 hosted by second domain 44, even though there is JavaScript 52 on the second webpage 36 that would enable the co-browsing session to continue, the first browser 10 does not let the JavaScript 52 on web page 36 see the cookie 34 written by webpage 22 from first domain 38. Since the session ID is contained in cookie 34, and the co-browse service 20 relies on the session ID to associate updates from the visitor with the correct co-browse session, the inability to read cookie 34 normally prevents a co-browse session 18 from extending from the first domain 38 to the second domain 44.

Figure 5A:
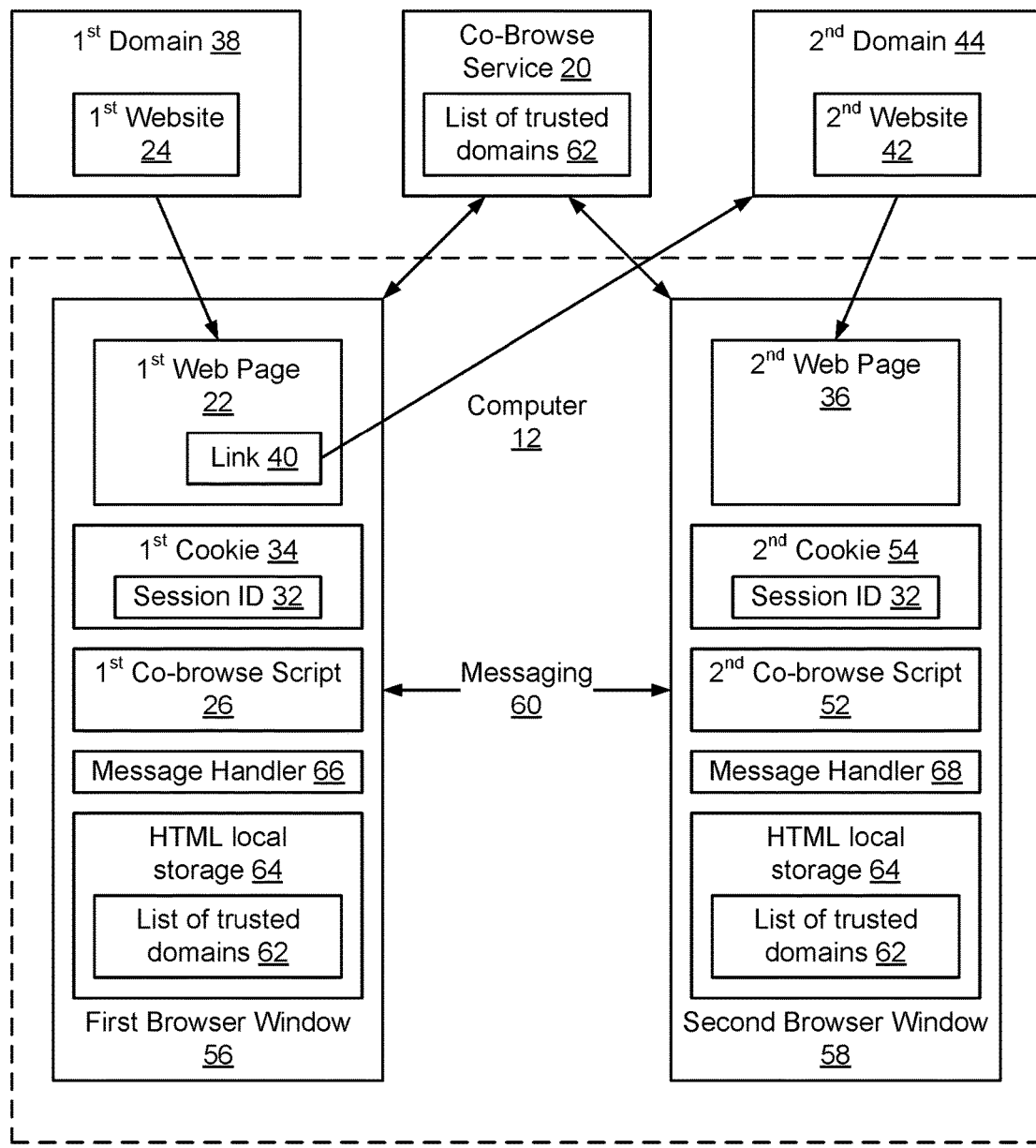
FIGS. 5A-5B are functional block diagrams of software constructs instantiated on a user's computer engaged in a co-browsing session during a transition from a first domain to a second domain where a link opens a web page in a new browser window.
Figure 5B:
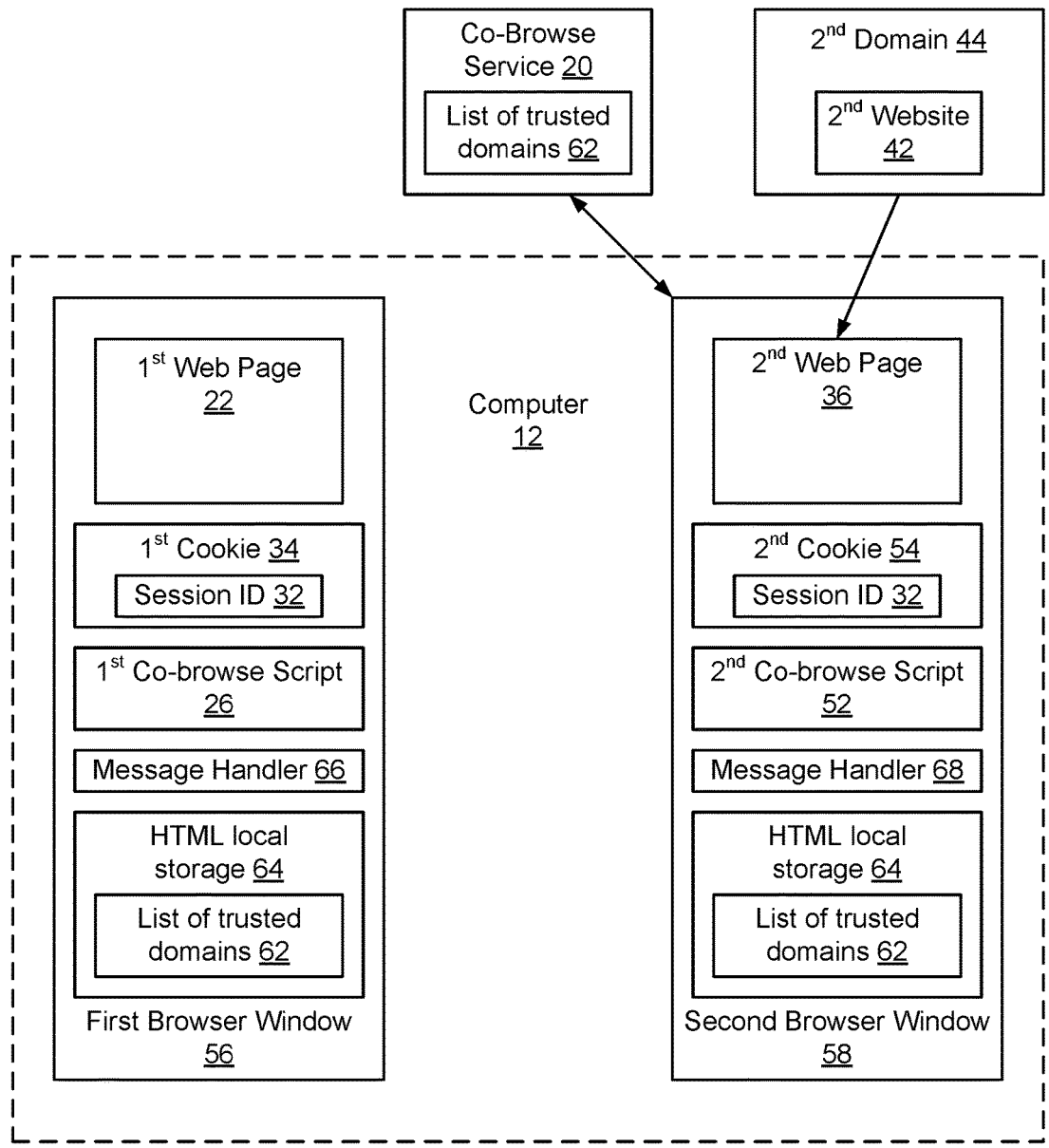

FIGS. 5A-5B and 6A-6B show one implementation that enables the session to continue between domains. In particular, FIGS. 5A-5B show the state of the user's computer when the user clicks on link 40 and the web page associated with the link is to open in a new window or a new browser tab. As shown in FIG. 5A, according to an implementation, when the user clicks on the link 40 on web page 22 loaded in a first browser window 56, a second browser window 58 is launched. The second web page 36 is loaded into the second browser window 58 and messaging 60 (see FIG. 7) is used to exchange parameters held by cookie 34 from the first domain 38 to cookie 54 from the second domain, so that the co-browsing session may continue uninterrupted across domains. As shown in FIG. 5B, the second browser window will then continue the co-browsing session 18 showing the content of web page 36.

In one implementation, a list of trusted domains 62 is specified by co-browse service 20. The list of trusted domains, in some embodiments, includes a list of trusted domains and, for each trusted domain, a corresponding cross-domain helper URL to any instrumented page that is hosted on that domain. An "instrumented page" as used herein is a web page containing co-browsing script that will allow co-browsing to occur from the page. An example set of trusted domains is shown in TABLE I:

TABLE I

| Trusted Domains | Corresponding URL to instrumented page hosted on domain (cross-domain helper URLs) |
| --- | --- |
| companyblog.com | http://www.companyblog.com/glance/GlanceCrossDomain.php |
| companyinfo.com | http://glance.companyinfo.com/glance/GlanceCrossDomain.aspx |
| mycompany.com | http://my.mycompany.com/home |

The URLs in this list are referred to herein as "cross-domain helper" URLs. When the visitor initiates a co-browse session (FIG. 7—box 100), the co-browse script 26 obtains, via an AJAX request to the co-browse service 20, information about the session including the co-browse session ID 32 and a list of trusted domains 62 and corresponding "cross-domain helper" URLs. The co-browse script 26 stores the co-browse session ID 32 in cookie 34 which is associated with first domain 38. (FIG. 7—box 102). The co-browse script 26 stores the list of trusted domains 62 and corresponding "cross-domain helper" URLs in HTML local storage 64. If the visitor is on a secure page, the list of trusted domains is stored in secure local storage, and if the visitor is on a non-secure page, the list of trusted domains is stored in non-secure local storage.

Figure 6A:
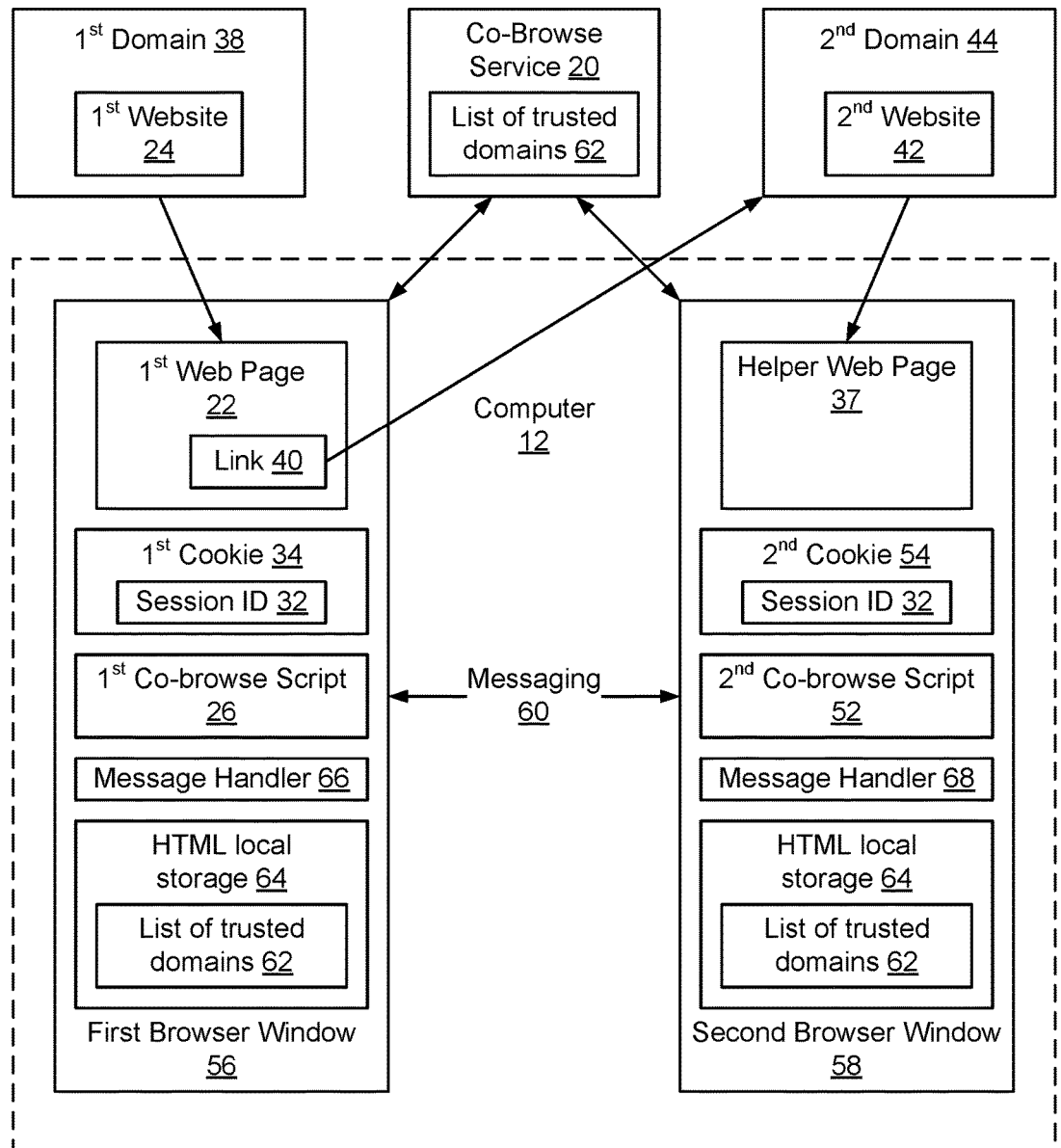

In one implementation, if clicking link 40 would normally open its target page on domain 44 in its own browser window or tab, separate and distinct from first browser window 56, then the click on link 40 causes browser 10 to open web page 36 in the second browser window (or tab) 58. This scenario is shown in FIGS. 5A-5B. If clicking link 40 would normally have opened its target page on domain 44 in first browser window 56, replacing web page 22, then the click causes browser 10 to open cross-domain helper URL's web page 37 for second domain 44 in its own separate (small) second browser window 58, and only for a brief period of time. This scenario is shown in FIGS. 6A-6B and happens only the first time a visitor crosses to the new domain 44.

Opening the cross-domain helper URL's web page 37 in second window 58 ensures two browser windows on the two domains are open at the same time, enabling messaging to be used as described herein. Each cross-domain helper web page 37 can be created specifically for this purpose (e.g., a lightweight intermediate page that loads quickly) or can be any already existing page on domain 44. Each cross-domain helper page can be written in any scripting language. The only requirement is that these helper pages be instrumented with the co-browse script 52. All domains involved must use the same script tag parameters, although the script need not be identical.

When in a co-browse session, on each page within domain 38 that the first browser navigates to, the script 26 adds a click event handler to each anchor tag (e.g. link 40) that goes to one of the trusted domains (e.g. second domain 44) (FIG. 7—box 104). The click event handler must open a new window, e.g. second browser window 58, to a page on the destination domain 44 that is instrumented with co-browsing script 52 compatible with the co-browsing script 26 of the first domain 38.

When the user clicks on a link 40 (FIG. 7—box 106), in one implementation a query string parameter such as GlanceSession=1 (indicating that a co-browsing session was occurring in the first browser window 56) is added to the URL that opens the second browser window 58 (FIG. 7—box 108), so that the second browser window 58 knows to communicate with its opener browser window 56 about continuing the co-browse session 18. If the link 40 normally opens in the same window (FIGS. 6A-6B), the event handler opens a new window, e.g. second browser window 58, to the "cross-domain helper" URL for that domain to load cross-domain helper web page 37. If the link 40 normally opens in a new tab or window (FIGS. 5A-5B), the event handler opens the link href in the new tab or window to load second web page 36. In either case, as shown in FIGS. 5A and 6A, there are now two browser windows open, first browser window 56 on the first domain 38 and second browser window 58 on second domain 44. These two windows usually can communicate with each other using cross-domain browser window messaging 60. One implementation of cross-domain browser window messaging uses postMessage( ) to enable the first browser window 56 and second browser window 58 to exchange first-party cookie information, so that the second browser window 58 can obtain the session ID 32 of the co-browse session 18 from cookie 34 in the first browser window 56 and use that co-browse session ID 32 to write cookie 54 in the second browser window 58 so that cookie 54 is able to store the same co-browse session ID 32 as was stored by cookie 34 in the first domain.

When the second browser window 58 opens, it loads a web page (36 or 37) that starts the instrumented co-browse script 52 of the destination domain 44. (FIG. 7—box 110). As noted above, the web page is either second web page 36 as shown in FIG. 5A if the second web page is supposed to open in a new browser window, or is cross-domain helper web page 37 as shown in FIG. 6A if the second web page is supposed to open in the same browser window.

In an implementation, the second browser window 58 is opened with an additional query string parameter GlanceSession=1 indicating that a co-browse session 18 is in progress at the first browser window 56. When the first browser window 56 opens the second browser window 58 to the URL with the query string parameter, it sets up a message handler 66 and starts listening for window messages. In one implementation, registering a handler for message events on its window may be accomplished using window.addEventListener( ). As indicated above, message handler 66 will only respond to messages from a trusted domain. In one implementation this may be enforced by verifying that the message sender, identified in event.origin, is included in the list of trusted domains, and only accepting events having an origin that matches one of the domains contained in the list of trusted domains 62. In another implementation, a wild card may be used in place of the list of trusted domains, although this provides a potential security issue by enabling the listener to accept events from any source domain.

Because communication between first browser window 56 and second browser window 58 is asynchronous, in one implementation several messages are exchanged between the two windows 56, 58 to enable the second browser window 58 to construct cookie 54 containing session ID 32. Specifically, these messages allow cookie 54, written by web page 36 on second domain 44, to be written using information stored in cookie 34 written by web page 22 on first domain 38.

For security, the windows 56, 58 will only post messages to and handle messages from other windows which have URLs that match one of the trusted domains in the list of trusted domains 62. The second browser window 58, like the first browser window 56, obtains the list of trusted domains 62 from the co-browse service 20. In an implementation this list may be obtained by the second browser window 58 by making an AJAX request to a web server hosting the co-browse service 20.

When the webpage 36 or cross-domain helper web page 37 loads, the co-browse script 52 on webpage 36 or cross-domain helper web page 37 checks for the GlanceSession=1 parameter. If it is not present, indicating that there is no previous ongoing session from some other domain, the co-browse script loads and runs as usual, checking for the presence of a cookie to determine whether it should participate in a co-browse session on the current domain. If the user takes action to start a co-browse session, such as by clicking on a link or button to start a co-browse session, the script will establish a new session.

If the ongoing session flag (GlanceSession=1) is present, the second browser window 58 expects to receive session information from first browser window 56 that opened it, so that second browser window 58 can join the pre-existing co-browse session 18 associated with webpage 22. Accordingly, in an implementation, the second browser window 58 obtains, via an AJAX request, the list of trusted domains 62. (FIG. 7—box 112). The second browser window 58 also sets up a message handler 68 (FIG. 7—box 114) to start listening for window messages, and posts a "ready_to_continue" message to the opener window (first browser window 56) (FIG. 7—box 116).

When the opener window (first browser window 56) receives the "ready_to_continue" message (FIG. 7—box 118), it puts information from its first-party co-browse cookie 34 into a "continue_session" message and posts the message to the second browser window 58 (FIG. 7—box 120). The information contained in the "continue_session" message may include, in an implementation, the co-browse session ID 32. The "continue_session" message may optionally also include other information from cookie 34, such as a value of the focus count 46, and a value of the random/assigned key flag 48. As noted above, focus count 46 allows the co-browse script 52 to help manage the case where multiple tabs/windows are open to enable the new window to know which window/tab has focus in the co-browse session 18. The random/assigned key flag 48 indicates whether the session was started with a random key vs a key based on visitor identity. Optionally, the "continue_session" message may further contain an indication as to whether the cookie 34 was secure or non-secure. Causing the "continue_session" message to indicate whether the cookie 34 was secure or non-secure enables a secure cookie to be created in the second browser window 58 if the first-party co-browse cookie 34 on the first browser window 56 was secure.

In an embodiment, the co-browse script 52 on webpage 36 uses the presence of the GlanceSession=1 parameter as an instruction to participate in a co-browse session upon receipt of the session ID.

When the second browser window 58 receives the "continue_session" message (FIG. 7—box 122), it writes cookie 54 as a first-party cookie in second domain 44, and then posts a "session_continued" message to the opener window (first browser window 56) (FIG. 7—box 124). The session ID 32 is used to write cookie 54 so that co-browse script 52 may continue the previous co-browse session 18. The co-browse script 52 then continues transmitting updates on the co-browse session so that the co-browse session can continue from the second domain.

If the cross-domain link 40 was supposed to open web page 36 in a new window or tab as shown in FIG. 5B, then the second browser window 58 remains open and goes on to continue the co-browse session as usual.

If the cross-domain link 40 was supposed to open second web page 36 in the same window as web page 22 as shown in FIG. 6B, the second browser window 58 closes itself (FIG. 7—box 126). For example, for links 40 with target="_self", once second cookie 54 has been written in the second browser window 58 for the second domain 44 by the (helper) web page 37, the original webpage 22 will open the web page 36 for link 40 in first browser window 56. The second browser window 58, which opened the cross-domain helper page 37, then closes itself. In this implementation the second browser window 58 is temporary and only remains open until the second cookie 54 has been written to enable the co-browse session to continue between domains.

In one implementation, the "continue_session" message includes a flag indicating what second browser window 58 should do after writing the cookie and posting the "session_continued" message back to its opener. Specifically, if the web page for link 40 was supposed to open in the same window, then second browser window 58 needs to close. Accordingly, in this instance the "continue session" message will include a flag indicating that the second browser window 58 should close. If link 40 was supposed to open in a different tab or different window, the "continue_session" message includes a flag having a value that instructs the second browser window 58 to do nothing (i.e. not close) after writing the cookie.

In an implementation, the browser maintains a list of domains already known to have written new first-party cookies. If the visitor clicks a link to a domain that is already known to be cookied, the browser can just go ahead and open the link normally.

The JavaScript for the cross-domain helper page may be packaged in regular co-browse scripts. This way, normal instrumented pages (such as web page 36) can serve as cross-domain helpers. When the visitor script opens the helper page or destination page, it appends a "GlanceSession=1" parameter to the URL. In the second browser window 58 on the second domain 44, the stub loader script will detect this parameter and load the full visitor script. The visitor script will detect this parameter and start the process of notifying the opener window that it is ready to receive messages, write the new cookie, etc. as described above.

Enabling the browsers to exchange information needed to write a new co-browse cookie for the destination domain allows the co-browse session to continue from the source domain to the destination domain. Additionally, since the parameters associated with the co-browse cookie that allow the co-browse session to be re-established at the destination are passed via messages between browser windows that will only flow between browser windows instantiated on the same user computer, an attacker is not able to cause a visitor to enter into a co-browse session unknowingly. For example, had the cookie information simply been passed on the URL query string to the destination page, it would be possible for an attacker to induce some other visitor to click on a link with such parameters, causing the visitor to enter into the co-browse session with no explicit agreement to participate. By causing this information to flow between two browser windows using messages, which can only be exchanged between two browsers on the same computer, the destination is able to ensure that the co-browse session was on-going at the source web page and is not first being established in connection with movement to the second domain 44. Further, because both windows 56, 58 have a list of trusted domains 62 which is obtained from an external trusted source, the co-browse session 18 can only be continued between pages corresponding to the set of trusted domains.

The previous description assumed that the browser windows (first browser window 56 and second browser window 58) are allowed to use window.postMessage to exchange messages with each other. Browsers with this capability include, for example, Google Chrome™, FireFox™, and Safari™.

Other browsers, such as Microsoft Internet Explorer™, do not support posting messages between windows on different domains. Since the first and second windows 56, 58 cannot exchange first-party cookie information via these messages, if the cookie information is to be passed from the first browser window 56 to the second browser window 58 it must be done using an alternative mechanism. One possibility is to include the cookie's session parameters in the URL that is passed to the second domain. For example, the cookie's session parameters may be passed in a URL query string as noted above. This presents a security risk, since the URL could be used cause a victim to continue a co-browse session that a malicious person has previously started. To prevent this, in an implementation, the user is provided with a notification in second browser window 58 indicating that second browser window has received an instruction to continue a co-browsing session, and provide the user with the option to disallow continuation of the co-browsing session.

In an implementation where messaging cannot be used to pass co-browse session parameters between browser windows 56, 58, the second browser window 58 will not be able to verify that it was opened via clicking a link in a page that was already in a co-browse session. For example, if the co-browse session ID 32 is passed as a URL query string parameter, webpage 36 is unable to trust that the person interacting with web page 22 had already agreed to and was participating in a co-browse session. To verify that the person had previously agreed to and was participating in a co-browse session, a notification is provided in the second browser window 58. Further, since the first domain 38 is not verified, in this implementation the second browser window may optionally not interrogate the co-browse service 20 for the list of trusted domains 62, since the second browser window 58 is not able to verify the source as being the first domain 38 and, hence, cannot verify the source against the list of domains.

Although embodiments were described in which messaging between browser windows is used to enable a co-browse communication session to continue between domains, other embodiments likewise may enable other forms of communication sessions to continue between domains.

As an example, a user of first computer 12 may elect, while on first web page 22, to initiate a chat based communication session. The ability to engage in a chat session from a website is common, as it provides the owner of the site with the ability to have an agent assist a visitor to the website. When the visitor elects to initiate a chat session, the chat session will either open in its own window or an in-line chat client may be overlaid on top of the website's browser window. Where the chat client is opened in-line, redirection of the first browser to second website 42 in second domain 44 may cause the chat based communication session to end.

According to an embodiment, selecting second website 42 in second domain 44 causes the second web page 36 to open in second browser window 58. A communication session ID associated with the chat based communication session is transmitted via the post-message exchange described above in connection with co-browse communication sessions, to enable the communication session ID to be passed to the second browser window. The second browser window contacts a chat server and uses the communication session ID to join the chat based communication session. In this manner the chat based communication session may continue from a first web page associated with a first domain to a second website associated with a second domain even where the initial chat client is opened in-line as an overlay to the first web page 22.

As another example, a user of first computer 12 may elect, while on first web page 22, to initiate a voice based communication session. Voice based communication sessions are commonly implemented as Voice over Internet Protocol (VoIP) calls that enable audio to be captured and passed by the computer over the Internet. Establishment of a VoIP communication session entails the use of SIP signaling to establish a media path through a communication network. Since the manner in which a VoIP communication session is established is well known, additional details of how this occurs will be omitted for brevity and to avoid obfuscation of other relevant aspects. Briefly, the establishment of a VoIP call will result in agreement between computers on opposite ends of the communication session on a combination of IP address, port, transportation protocol, and media path to be used for the communication session on the network.

In connection with establishing the network socket and connection between the peers, or once the network connection has been established, the computer will create one or more local data streams and data channel endpoints pointing at the first browser. Accordingly, where the voice/video communication session is caused to occur through the first browser, redirection of the first browser 10 to second website 42 in second domain 44 may cause the local data stream to point to a browser window that no longer has focus. Accordingly, the user may no longer be able to participate on the communication session via the new tab or new browser window.

According to an embodiment, selecting second website 42 in second domain 44 causes the second web page 36 to open in second browser window 58. A communication session ID associated with the voice based communication session is transmitted via the post-message exchange described above in connection with co-browse communication sessions, to enable the communication session ID to be passed to the second browser window. The second browser window uses the communication session ID to specify to the JavaScript SIP API on the second web page to notify the WebRTC stack that the local data stream should point to the second browser. This enables the local data stream to be redirected to enable the new browser to connect to an on-going voice or video communication session that has previously been signaled on the network without requiring new SIP signaling processes to re-establish a new voice/video communication session.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more non-transitory tangible computer-readable storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), cache, optical or magnetic disk, Redundant Array of Independent Disks (RAID), floppy drive, CD, DVD, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), tablet or handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Implementations of the systems and methods described above comprise computer components and computer-implemented steps that will be apparent to those skilled in the art. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

THE FOLLOWING REFERENCE NUMERALS ARE USED IN THE DRAWINGS 10 first browser
12 first computer
14 second browser
16 second computer
18 co-browse session
20 co-browse service
22 web page
24 website
26 co-browse script
28 list of masked elements
30 web page
32 co-browse session ID
34 cookie
36 second webpage
37 cross-domain helper webpage
38 first domain
40 link
42 second website
44 second domain
46 focus count flag
48 random/assigned key flag
50 secure flag
52 second co-browse script
54 second cookie
56 first browser window 58 second browser window
60 messaging
62 list of trusted domains
64 HTML local storage
66 message handler
68 message handler Although the methods and systems have been described relative to specific embodiments thereof, they are not so limited. Many modifications and variations may become apparent in light of the above teachings. Many additional changes in the details, materials, and arrangement of parts, herein described and illustrated, may be made by those skilled in the art. A number of implementations have been described. Nevertheless, it will be understood that additional modifications may be made without departing from the scope of the inventive concepts described herein, and, accordingly, other implementations are within the scope of the following claims.

What is claimed is:

1. A method of maintaining a communication session across domains, the method comprising the steps of:
    loading a first web page from a first domain in a first browser window on a first computer at a first location;
    initiating a first communication session through the first browser window to a remote browser window on a second computer at a second location, the first communication session having a first communication session identifier;
    receiving, by the first browser window, a click event selecting a link to a second web page from a second domain;
    opening the second web page from the second domain in a second browser window on the first computer at the first location;
    messaging between the first browser window on the first computer and the second browser window on the first computer to pass the first communication session identifier to the second browser window; and
    using the first communication session identifier by the second browser window to join the first communication session.

2. The method of claim 1, wherein the first communication session is a text-based communication session established through the first browser window.

3. The method of claim 2, wherein the step of initiating the first communication session comprises opening a chat window overlaid on top of the first browser window.

4. The method of claim 1, wherein the first communication session is a voice or video based communication session established through the first browser window.

5. The method of claim 4, wherein the voice or video based communication session comprises a signaled connection on the network, and wherein a local connection within the first computer interconnects the signaled connection on the network with the first browser window.

6. The method of claim 5, wherein the step of using the first communication session identifier comprises redirecting the local connection to cause the local connection to interconnect the signaled connection on the network with the second browser window.

7. The method of claim 1, wherein the first communication session is a co-browse communication session in which the content of the first browser is able to be viewed in the remote browser window on the second computer at the second location.

8. The method of claim 1, wherein the step of messaging comprises the steps of opening a message handler on the first browser window, opening a message handler on the second browser window, and using post message to communicate the first communication session identifier to the second browser window.

9. The method of claim 8, further comprising the steps of determining, by the second browser window, a source of the post message, comparing, by the second browser window, the identified source of the post message with a list of trusted domains, and only accepting the post message having an origin that matches one of the domains contained in the list of trusted domains.

10. A method of enabling co-browsing between domains, the method comprising the steps of:
    loading a first web page from a first domain in a first browser window on a first computer at a first location, the first web page having first co-browse script to participate in a co-browse session in which the content of the first browser window is viewable in a remote browser window on a second computer at a second location;
    initiating, by the co-browse script, the co-browsing session from the first web page to enable the content of the first browser to be viewed in the remote browser window on the second computer at the second location;
    writing, by the first co-browse script, a first domain first-party cookie containing as a value a session ID of the co-browse session;
    receiving, by the first browser window, a click event selecting a link to a second web page from a second domain;
    opening the second web page from the second domain in a second browser window on the first computer at the first location, the second web page having second co-browse script;
    messaging between the first browser window on the first computer and second browser window on the first computer to pass the session ID of the co-browse session contained in the first domain first-party cookie to the second browser window;
    writing, by the second co-browse script in the second browser window, a second domain first-party cookie containing, as a value, the session ID of the co-browse session;
    using the session ID, by the second co-browse script, to join the co-browse session; and
    transmitting, by the second co-browse script on the second web page, the content of the second browser window to the remote browser window.

11. The method of claim 10, further comprising the step of closing the second browser window.

12. The method of claim 10, wherein if the click event selecting the link is configured to open to a new window or a new tab in the first browser, the method further comprising the step of replacing a URL associated with the link to a cross-domain helper URL and the step of opening the second web page causes the cross-domain helper URL to be opened in the second window.

13. The method of claim 12, wherein the cross-domain helper URL is scripted with co-browse script.

14. The method of claim 10, further comprising the step of forwarding a URL to the second domain after the step of receiving, by the first browser window, the click event selecting the link to the second web page from the second domain, wherein the step of forwarding the URL comprises adding a tag to the URL to identify the presence of the co-browse session.

15. The method of claim 14, wherein the tag identifying the presence of the co-browse session does not include the session ID of the co-browse session.

16. The method of claim 14, wherein the tag identifying the presence of the co-browse session does include the session ID of the co-browse session.

17. The method of claim 16, further comprising the step of notifying via the first browser window that a co-browse session is being started or joined by the second browser window.

18. The method of claim 10, wherein the step of messaging comprises the steps of opening a message handler on the first browser window, opening a message handler on the second browser window, and using post message to communicate the first communication session identifier to the second browser window.

19. The method of claim 18, further comprising the steps of determining, by the second browser window, a source of the post message, comparing, by the second browser window, the identified source of the post message with a list of trusted domains, and only accepting the post message having an origin that matches one of the domains contained in the list of trusted domains.

20. The method of claim 10, wherein the step of messaging further comprises the transmission of additional cookie parameters from the first domain first-party cookie to the second browser window, and wherein the step of writing the second domain first-party cookie by the second co-browse script in the second browser window, causes the second domain first-party cookie to contain, as values, the additional cookie parameters.

21. The method of claim 20, wherein the additional cookie parameters include a cookie security attribute.

* * * * *